United States Patent [19]
Christensen et al.

[11] Patent Number: 5,380,576
[45] Date of Patent: Jan. 10, 1995

[54] HIGH MODULUS FIBER PROTECTIVE CARRIER SYSTEMS AND METHODS FOR THEIR USE

[75] Inventors: Don C. Christensen, Dublin; Milton F. Custer, Byron, both of Calif.

[73] Assignee: Hexcel Corporation, Pleasanton, Calif.

[21] Appl. No.: 6,504

[22] Filed: Jan. 21, 1993

[51] Int. Cl.⁶ ............................ B32B 5/12; B32B 7/12
[52] U.S. Cl. .................................. 428/109; 428/113; 428/354; 428/480; 428/903
[58] Field of Search ............... 428/109, 113, 40, 903, 428/480, 354

[56] References Cited

U.S. PATENT DOCUMENTS

| | | | |
|---|---|---|---|
| 2,671,306 | 3/1954 | Slayter | 57/140 |
| 3,062,697 | 11/1962 | Novak | 156/178 |
| 3,147,582 | 9/1964 | Scharf | 57/165 |
| 3,591,434 | 7/1971 | Hartstein | 428/109 X |
| 3,632,034 | 1/1972 | Kozak et al. | 228/4 |
| 3,687,776 | 8/1972 | Allard et al. | 156/306 |
| 3,919,028 | 11/1975 | Lewis et al. | 156/148 |
| 4,070,214 | 1/1978 | Brown et al. | 156/47 |
| 4,110,505 | 8/1978 | Prewo | 428/114 |
| 4,310,581 | 1/1982 | Felter et al. | 428/109 |
| 4,589,942 | 5/1986 | Korinek | 156/148 |
| 4,769,202 | 9/1988 | Eroskey et al. | 264/166 |
| 4,857,385 | 8/1989 | Armiger et al. | 428/109 X |
| 4,975,232 | 12/1990 | Hattori et al. | 264/137 |
| 5,067,998 | 11/1991 | Singh et al. | 156/89 |
| 5,198,280 | 3/1993 | Harpell et al. | 428/109 X |

*Primary Examiner*—Daniel Zirker
*Attorney, Agent, or Firm*—Poms, Smith, Lande & Rose

[57] ABSTRACT

A composite pre-slit tape useful as a protective carrier system for storing and handling high modulus fibers and processes for protecting such fibers are disclosed. An exemplary composite pre-slit tape includes a plurality of generally elongated and collimated pre-slit laminates oriented in a single plane and releasably bonded to a removable continuous backing layer which is in the form of a long thin tape. Each pre-slit laminate includes an adhesive layer located adjacent the continuous backing layer and a fiber supporting layer located adjacent the adhesive layer. In use as a fiber protective carrier, each pre-slit laminate is bonded to a fiber bundle of a plurality of collimated fibers arranged in a single layer. Each fiber is bonded along its length to the supporting layer of the pre-slit laminate. The combination of secured fibers and pre-slit laminate can be fed directly to a loom for forming woven fabric.

11 Claims, 2 Drawing Sheets

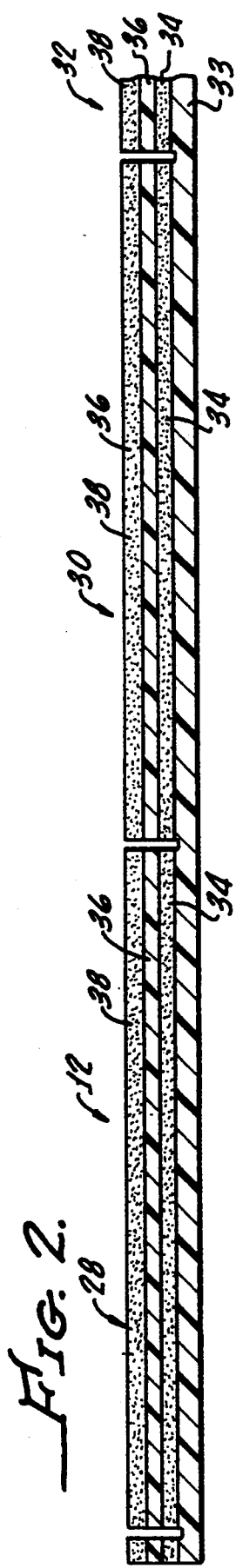
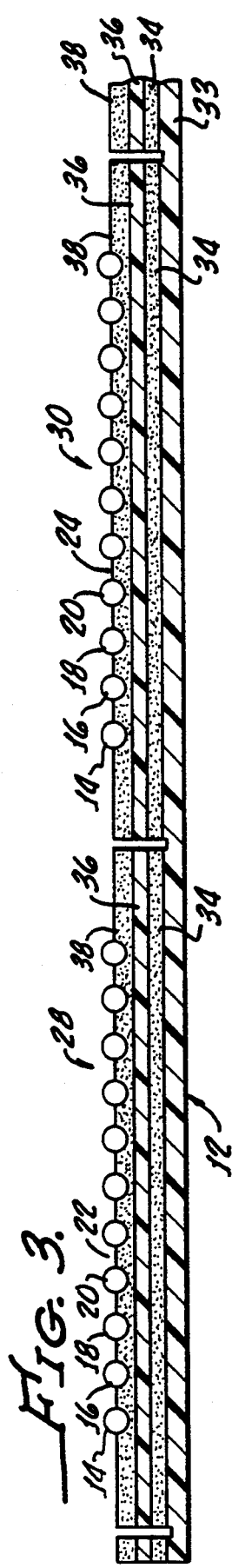
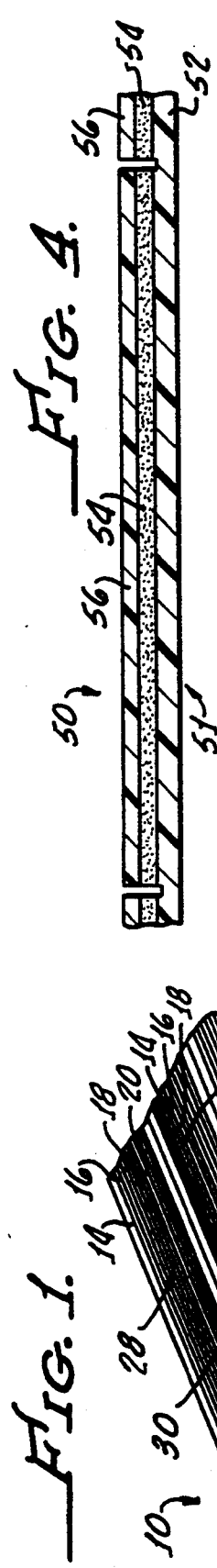
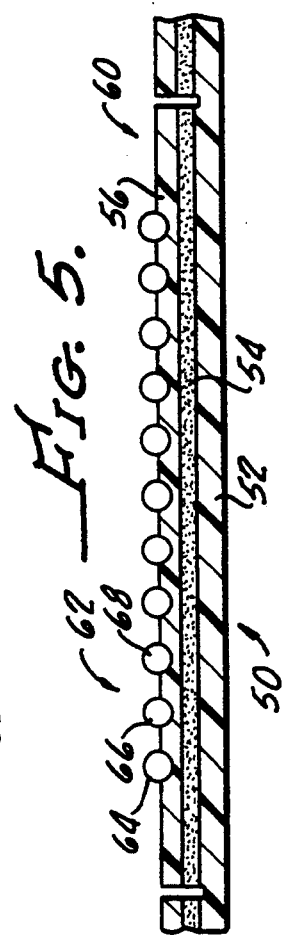
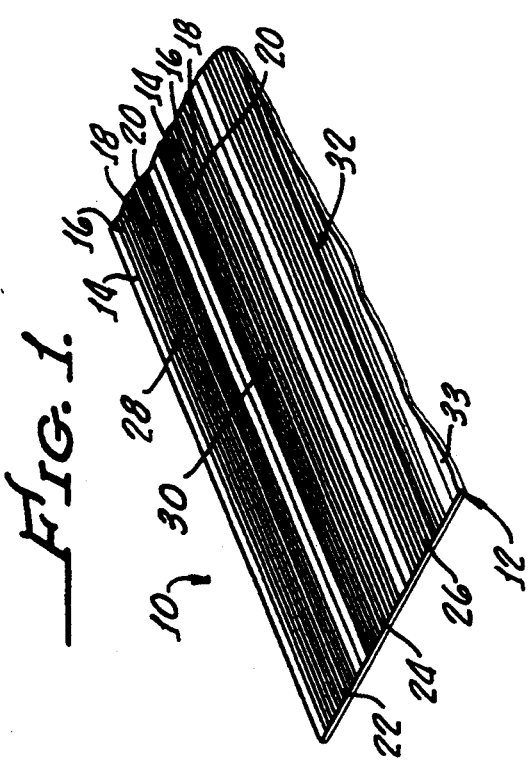

HIGH MODULUS FIBER PROTECTIVE CARRIER SYSTEMS AND METHODS FOR THEIR USE

BACKGROUND OF THE INVENTION

1. Field of The Invention

The present invention relates generally to high modulus fibers and systems and methods for their handling and storage. More particularly, the present invention involves the use and design of protective carrier devices for high modulus fibers used in manufacturing high strength woven fabric reinforcements.

2. Description of Related Art

During the past several years many researchers in the structural materials and sport equipment industry have focused on developing low density materials having increased strength and higher temperature resistance. For example, low weight structural materials having high stiffness and strength at temperatures in excess of 3,000° F. are in high demand for advanced aerospace applications. Similarly, low density, high impact resistant materials are continually in demand for fabricating racquets and related equipment used in sporting events.

In particular, continuous reinforced composite materials or ceramic matrix composites have enjoyed increased use as high temperature high strength structural materials. Typically, these materials are prepared by impregnating a woven fabric reinforcement with a ceramic slurry to form a prepreg which is then subjected to conventional lay-up procedures to form a molded layup. After heat treating or firing the molded layup, a relatively low density high strength ceramic object forms which is useful in a number of high temperature structural applications.

Generally, the woven fabric reinforcement is formed of continuous fibers such as silicon carbide, alumina, graphite, or quartz which are woven like a yarn in conventional weaving equipment to form the fabric. These materials can have a relatively high modulus which make them generally stiff, brittle and prone to breaking when placed in a bent configuration. Fortunately, many of these high modulus materials can be drawn or made into such small diameter fibers or filaments that they can be bent and even tied into knots without breaking. Thus, fabric reinforcements formed of very fine diameter high modulus continuous fibers can be handled and woven without breaking the fibers. Additionally, layup procedures can be performed using these woven fabrics without risking a decrease in the fabric's structural integrity due to fiber breakage.

More recently, material technology has led to the development of boron, yttrium, yttrium aluminum garnet, and single crystal alumina (sapphire) continuous fibers. In particular, single crystal alumina fibers have remarkably high strengths and elevated temperature service properties making them especially attractive for woven fabrics used for the manufacture of continuous fiber ceramic matrix composites. A major problem associated with handling sapphire fibers and producing viable continuous sapphire fiber woven fabrics is the limited fiber diameter available using conventional fiber drawing procedures. Current techniques for drawing single crystal alumina fibers are limited to drawing sapphire fibers having a minimum diameter of about 3 mils. Because the modulus of single crystal alumina is on the order of $51 \times 10^6$ psi, fibers having diameters of 3 mils are not capable of bending with less than about a quarter inch radius without breaking. This bending radius limitation dramatically affects the ability to handle sapphire fibers having lengths suitable for incorporating into continuous fiber fabrics. Thus, handling very high modulus fibers in conventional weaving equipment causes significant fiber breakage, resulting in poor quality and low strength fabrics.

One early approach to this sapphire fiber handling and weaving problem involved chopping continuous length fibers into smaller random lengths ranging from 1 inch to 3 inches and then converting the random lengths into a staple yarn. This technique proved to be unsuccessful because the stiff short sections were uncontrollable during the weaving process. In an attempt to overcome the problem with the staple yarn, the staple process was modified to include serving. This modification resulted in the ability to produce a yarn, however, the yarn had severely limited tensile strength.

In order to address the low tensile strength associated with the staple yarn and serving approach, this method was modified to incorporate a fugitive dacron carrier yarn during the staple yarn forming process and prior to serving. This modification did yield a weavable yarn. However, once the fugitive dacron carrier yarn and the serving yarn were removed from the woven fabric, subsequent handling caused the yarn to disintegrate and revert to individual fibers in a non-yarn form. This can occur, for example, during a ceramic matrix composite fabric impregnation step.

Of course, the development of processes for drawing single crystal alumina fibers having diameters on the order of less than 10 microns which can then be combined to form flexible multifilament weavable yarns is also a suggested approach to this handling problem. However, the cost considerations and technical limitations relating to making small diameter filaments is not viewed as a viable alternative.

Accordingly, it is an object of the present invention to provide processes and associated systems for handling continuous length high modulus fibers having minimum diameter limitations in order to reduce or eliminate fiber breakage during handling.

It is a further object of the present invention to provide materials and processes for protecting high modulus fibers during conventional woven fabric weaving processes utilizing high strength woven fabrics.

SUMMARY OF THE INVENTION

The present invention satisfies the above-described objectives by providing high modulus fiber protective carrier systems and processes for handling and storing high modulus fibers in a manner which maintains their physical integrity. Advantageously, the high modulus fiber protective carrier systems and associated processes of the present invention can be utilized to protect lengths of fibers during manufacturing processes which involve bending the fibers. The invention also provides the advantage of making a visible article from clear, transparent, nearly invisible fiber components. For this reason, the practice of the present invention is particularly useful in connection with storing and handling high modulus fibers for weaving applications. However, those skilled in the art will recognize that the devices and processes of the present inventions are useful in any application in which supporting fibers or filaments is benefit.

More particularly, the present invention provides composite pre-slit tapes useful as fiber protective carriers which include a plurality of generally elongated and collimated pre-slit laminates oriented in a single plane and releasably bonded to a removable continuous backing layer. Each pre-slit laminate includes a releasably bonding adhesive layer located adjacent to the continuous backing layer, and a fiber supporting film layer located adjacent the releasably bonding adhesive layer. The adhesive layer provides a bonding interface for releasably bonding each pre-slit laminate to the continuous backing layer. Preferred embodiments further include a second adhesive layer covering the fiber supporting film layer.

In accordance with the present invention, when the composite pre-slit tape is in use as a fiber protective carrier, each pre-slit laminate further incorporates a fiber bundle formed of a plurality of collimated fibers in a single layer with each fiber having a length and a diameter. In order to immobilize the fiber bundles, each fiber is separately bonded along its length to the fiber supporting layer. The continuous backing layer of the composite pre-slit tape is in the form of an elongated continuous tape. The width of the tape can vary with the number and size of fiber bundles supported by the fiber protective system. Similarly, the length of the backing film can vary with the intended use of the protected fiber bundles, each of which is immobilized by a corresponding single pre-slit laminate extending the length of the backing film.

In preferred applications intended for supporting and handling continuous fibers used in conventional weaving processes, the pre-slit composites are typically about 3 inches wide and include up to about 50 pre-slit laminates, each being about 52 mils wide and immobilizing a single fiber bundle of about 11 fibers. The length of the backing film is limited only by the logistics of handling long tape-like constructions, it being contemplated as being within the scope of present invention to provide the composite pre-slit tape in the form of a roll for immobilizing large quantities of continuous fibers.

Further, and in accordance with the present invention, processes and systems are provided for immobilizing and protecting fibers for storage and handling. An exemplary process involves combining fibers and the composite pre-slit tape of the present invention and includes first forming a plurality of collimated fiber bundles in a single layer, each of the fiber bundles being formed of a plurality of collimated fibers arranged in a single layer. Then each of the collimated fiber bundles is secured to the composite pre-slit tape by bonding the length of each fiber of a single fiber bundle to the fiber supporting layer of a corresponding single pre-slit laminate.

Advantageously, the fiber protective carrier system of the present invention is conveniently adapted to methods for handling protected fibers in processes involving their incorporation into a useable product. An exemplary handling process involves providing protected fibers in the form of the combination of fiber bundles and composite pre-slit of the present invention, removing the releasably bonded backing layer, and then feeding the plurality of pre-slit laminates, each having a secured fiber bundle, to selected processing equipment. Preferred processes are those in which the processing equipment is at least one weaving loom and the fiber bundles function as yarns for the fabrication of woven cloth.

Further objects, features, and advantages of the present invention will become apparent to those skilled in the art from a consideration of the following detailed description when considered in combination with the following drawings.

BRIEF DESCRIPTION OF THE DRAWINGS

FIG. 1 is a fragmentary perspective view of a portion of a fiber protective carrier of the present invention illustrating a composite pre-slit tape supporting a plurality of fiber bundles.

FIG. 2 is a cross sectional fragmentary view of a composite pre-slit tape of the present invention and illustrates pre-slit laminates releasably bonded to a backing layer.

FIG. 3 is a cross-sectional view of a fiber protective carrier of the present invention and includes the composite pre-slit tape of FIG. 2 supporting fiber bundles.

FIG. 4 is a cross-sectional fragmentary view of an alternative embodiment composite pre-slit tape of the present invention.

FIG. 5 is a cross-sectional fragmentary view of a fiber protective carrier of the present invention and includes the composite pre-slit tape of FIG. 4 supporting fiber bundles.

DETAILED DESCRIPTION OF PREFERRED EMBODIMENTS

Figure 6:
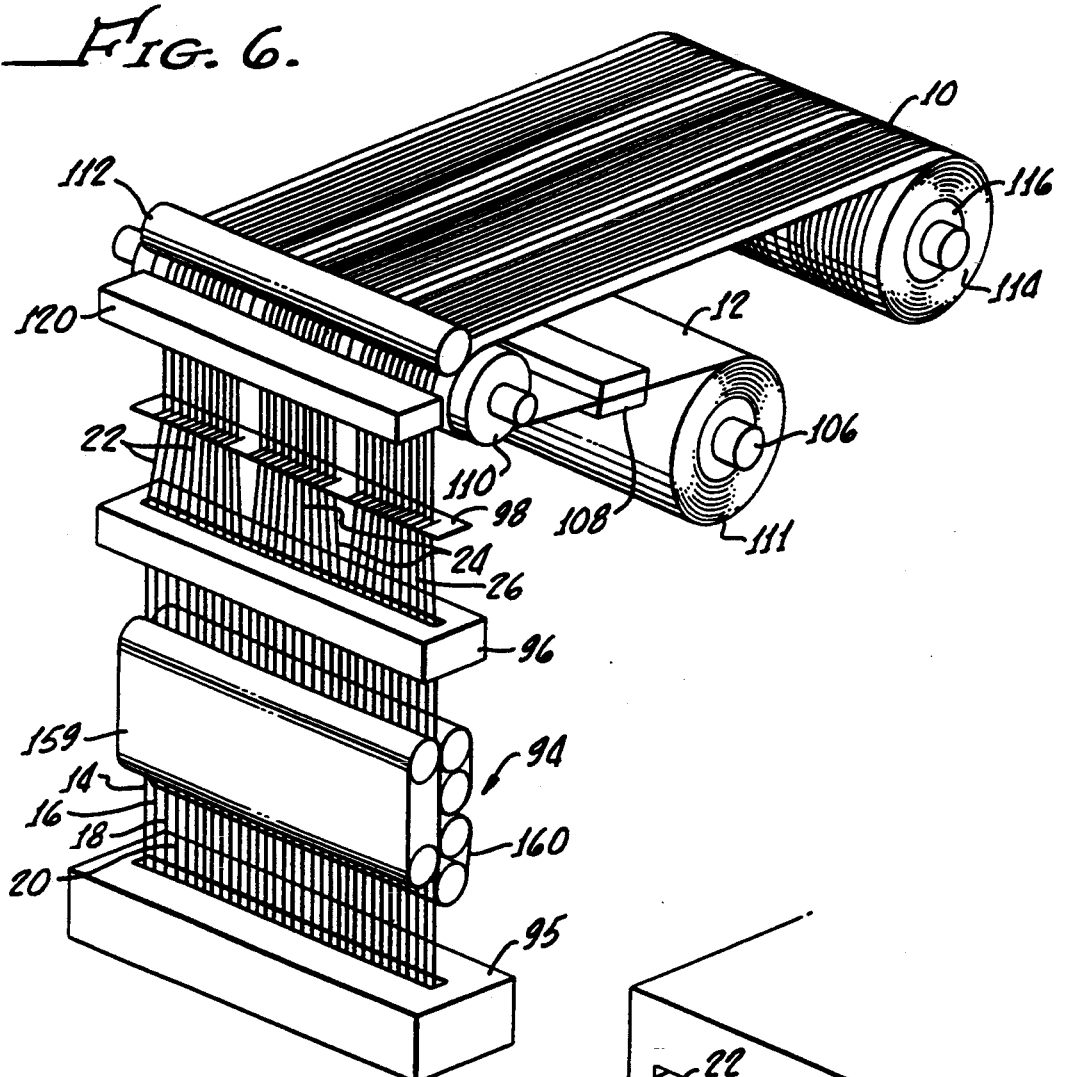
FIG. 6 is a graphical illustration of a system for producing a fiber protective carrier protecting high modulus fiber bundles in accordance with the present invention.

The present invention is based upon the discovery that fibers utilized in structural applications can be secured to suitable support systems and subsequently stored and processed while maintaining their physical integrity. This discovery has particular significance for processes involving handling high modulus fibers which tend to break upon even slight bending. In fact, the protective systems of the present invention will support fibers having a modulus in excess of $65 \times 10^6$ psi and diameters of 3 mm.

The ability to protect high modulus fibers makes the systems and processes of the present invention useful for applications involving fibers such as single crystal alumina fibers which have a high modulus and minimum diameter limitations. In particular, the practice of the present invention allows continuous lengths of sapphire fibers to be formed into woven fabric utilizing conventional weaving equipment without significant fiber breakage. However, those skilled in the art will recognize that the teachings of the present invention are not limited to handling sapphire fibers or high modulus fibers in general. In fact the systems and process of the present invention are equally applicable for the safe handling of any type of fiber to assure proper support and minimum breakage.

In one aspect, the present invention provides a fiber protective carrier generally shown as numeral 10 of FIG. 1. The fiber protection carrier 10 is typically in the form of a generally elongated tape with FIG. 1 providing a fragmentary perspective view of the fiber protective carrier which includes a composite pre-slit tape 12 and a plurality of supported fibers 14, 16, 18, 20 grouped into fiber bundles 22, 24, 26. A plurality of generally elongated and collimated pre-slit laminates 28, 30, 32 releasably bonded to a continuous backing layer 33 form composite pre-slit tape 12 with each pre-slit laminate 28, 30, 32 providing support for a single fiber bundle 22, 24, 26, respectively.

Turning to FIG. 2 there is illustrated a cross-sectional view of composite pre-slit tape 12 including collimated pre-slit laminates 28, 30, and a portion of pre-slit laminate 32 all oriented in a single plane and releasably bonded to removable continuous backing layer 33. Each of the pre-slit laminates 28, 30, 32 includes a first adhesive layer 34, for releasably bonding continuous backing layer 33, and a fiber supporting layer 36 positioned between first adhesive layer 34 and a second adhesive layer 38. FIG. 3 is a cross-sectional illustration of the fragmentary view of the fiber protection carrier 10 illustrated in FIG. 1 and shows composite pre-slit tape 12 of FIG. 2 in its functional embodiment.

More particularly, fiber protective system 10 shown in FIG. 3 includes composite pre-slit tape 12 further incorporating fiber bundles 22, 24 separately bonded to pre-slit laminates 28, 30, respectively. Each fiber bundle 22, 24 is formed of a plurality of collimated fibers 14, 16, 18, 20 oriented in a single layer with each fiber having a length and a diameter. In order to immobilize each fiber bundle 22, 24, second adhesive layer 38 adhesively bonds each fiber 14, 16, 18, 20 along its length to fiber supporting layer 36.

In accordance with the present invention the composite pre-slit tape 12 and its continuous backing layer 33 will vary in width in accordance with the width and number of pre-slit laminates 28, 30. In preferred applications in which the protected fibers are eventually woven into a reinforcing fabric, the width of each pre-slit laminate 28, 30, will depend upon the preferred number of fibers 14, 16, 18, 20, forming each fiber bundle 22, 24 and the number of fiber bundles handled by the associated weaving equipment.

It is contemplated as being within the scope of present invention to provide a composite pre-slit tape in the form of a roll for immobilizing large quantities of continuous fibers. Accordingly, the length of the continuous backing film 33 can vary with the intended use of the protected fiber bundles 22, 24, and from a practical view is limited only by the logistics of handling long tape-like constructions. For supporting and handling continuous fibers used in conventional weaving processes, pre-slit composite 12 and the continuous backing layer 33 are typically about 3 inches wide and include up to about 50 pre-slit laminates, each being about 52 mils wide and immobilizing a single fiber bundle of about 11 fibers.

In order to provide physical integrity to the composite pre-slit tape of the present invention, removable continuous backing layer 33 should be formed of material having little or no stretchability. This characteristic prevents undesirable independent movement of the pre-slit laminates 28, 30 and the secured fiber bundles 22, 24. Accordingly, suitable materials include thin films of metal foils and films of relatively high modulus organic polymers including polyethyleneterephthalate films having thicknesses on the order of 0.5 to 5 mils and a preferred thickness of 1.5 mils.

Materials suitable for forming first adhesive layer 34 include any adhesive which can be brushed, sprayed, rolled, or drawn to form an adherent layer capable of releasably bonding the fiber supporting layer 36 and the continuous backing layer 33. For purposes of the present invention, releasably bonding means forming bonds having strengths which are sufficiently strong to secure pre-slit laminates 28, 30 to continuous backing layer 33 during storage and handling, and sufficiently weak to release pre-slit laminates 28, 34 during fiber processing as described in more detail below. Those skilled in the art will recognize that the choice of adhesive for forming first adhesive layer 34 is dependent upon the type of materials selected for the continuous backing layer 33 and the fiber support layer 36. For composite pre-slit tapes having a continuous backing layer 33 and a fiber support layer 36 of polyethyleneterephthalate a suitable adhesive is a repositioning spray available from 3M under the trademark ReMount. Similarly, adhesives suitable for forming second adhesive layer 38 include any adhesive having adhesion properties suitable for bonding fiber support layer 36 and fibers 14, 16, 18, 20. It has been found that typically, and advantageously, second adhesive layers can be formed of the same adhesive used to form first adhesive layer 34. In accordance with the present invention first adhesive layer 34 and second adhesive layer 38 have adhesive thickness ranging from 0.500 inches to 0.002 inches.

In accordance with the present invention, and as will become evident in the discussion below, in preferred embodiments fiber support layer 36 should be fabricated of a material which will burn-off cleanly at ceramic processing temperatures. Accordingly, fiber support layer 36 is preferably formed of organic film forming polymers such as polyethyleneterephthalate sold under the trademark MYLAR. In preferred embodiments of the present invention, MYLAR is a preferred material because it burns cleanly without physically disrupting fibers. Additionally, MYLAR is capable of forming thin films of about 1 mil which has been found to be a suitable film thickness for fiber protective carriers utilized for storing and feeding fibers to conventional weaving equipment. Even though preferred film thickness are about 1 mil, fiber support layers having thickness of 0.5 mils to 5.0 mils are also useful in the practice of the present invention. However, other film forming polymers can be used including polyethylene, polypropylene and nylon. These may or may not be reinforced.

Since the fiber protective carrier systems and associated processes of the present invention provide a means for storing and handling fibers while avoiding significant fiber breakage, suitable fibers include, but are not limited to, those having a tendency to break as the result of even slight bending. These include fibers having such large diameters that normal handling causes them to break and fibers having a modulus greater than about $30 \times 10^6$ at a fiber diameter of $>15$ mils. Such fibers include single crystal alumina, boron, yttrium, and yttrium aluminum garnet (YAG) fibers. Preferred fibers are drawn from single crystal alumina or sapphire.

In accordance with the present invention, alternative embodiments, shown in FIG. 4 and FIG. 5, are provided for the fiber protective carrier and the composite pre-slit tape described above. These alternative embodiments differ from FIG. 2 and FIG. 3 in that they incorporate only one adhesive layer. More particularly, FIG. 4 illustrates a fragmentary cross-sectional view of a composite pre-slit tape 50 having the general form of elongated composite pre-slit tape 12 of FIG. 1. The alternative embodiment of FIG. 4 is shown as a single pre-slit laminate 51 releasably bonded to a removable continuous backing layer 52. Pre-slit composite 51 includes adhesive layer 54 for releasably bonding pre-slit composite 51 to continuous backing layer 52. A fiber support layer 56 is positioned adjacent adhesive layer 54 and opposite continuous backing layer 52.

Turning to FIG. 5 there is illustrated a cross-sectional view of a fiber protective carrier 60 which includes the composite pre-slit tape 50 shown in FIG. 4 combined with immobilized fiber bundle 62. Fiber bundle 62 includes individual collimated fibers 64, 66, 68 oriented in a single plane, each having a diameter and a length. In order to immobilize fiber bundle 62, each of fibers 64, 66, 68 are bonded along their lengths directly to fiber support layer 56. Directly bonding fibers 64, 66, 68 is possible when fiber support layer 56 is fabricated of material having sufficient tackiness to directly secure fibers 64, 66, 68 to fiber support layer 56. The tacky characteristics of fiber support layer 56 can be inherent in the material at ambient conditions or sufficient tackiness can be imparted to fiber support layer 56 with the application of heat or other energy sources. Accordingly, in contrast to polyethylenephthalate films which are suitable for fabricating fiber support layer 36 of the embodiments of FIG. 2 and FIG. 3. materials suitable for fabricating fiber support layer 56 are prepared from tacky or in conjunction with tack forming materials including adhesives, thermoplastic and thermosetting resins.

It should be noted that the fragmentary views of composite pre-slit tape 50 shown in FIG. 4 and the fiber protective carrier 60 of FIG. 5 are shown as incorporating single pre-slit laminates. It is understood, however, that the alternative embodiments shown in FIG. 4 and FIG. 5 each incorporate a plurality of collimated pre-slit tape laminates oriented in a single plane as generally shown in FIG. 1.

Figure 7:
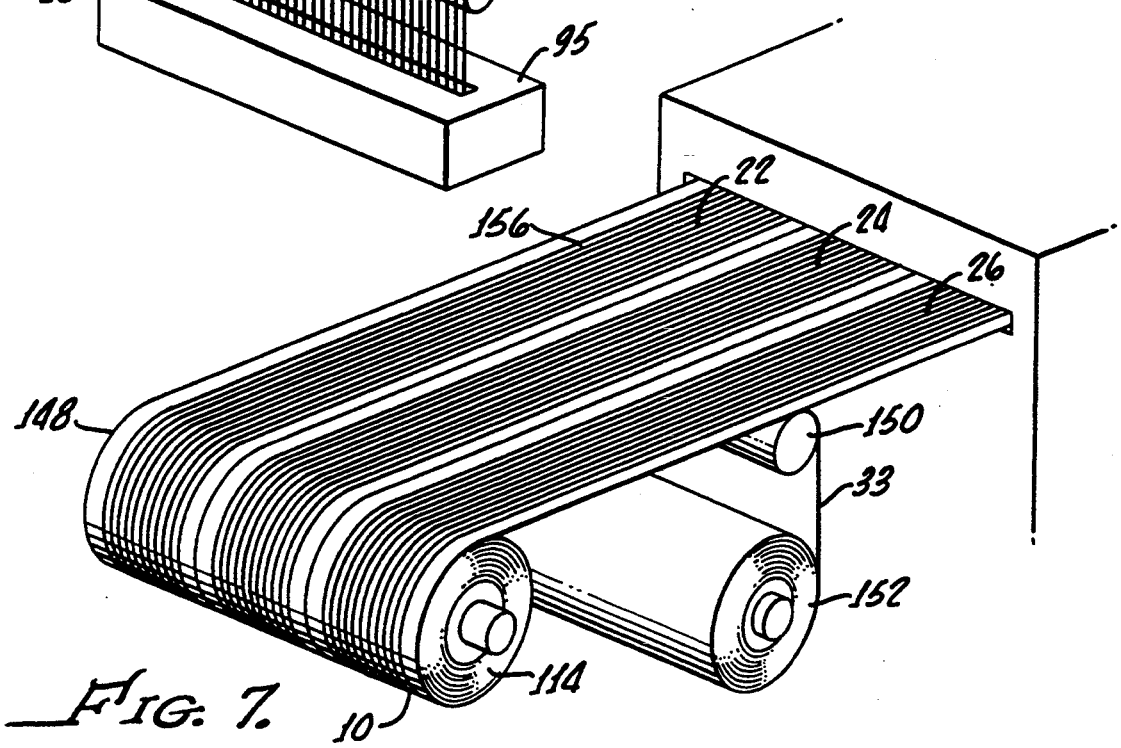
FIG. 7 is a graphical illustration of a system for handling protected high modulus fibers in accordance with the present invention.

An exemplary system for forming fiber protective carriers for storage and subsequent handling and an exemplary system for utilizing protected fibers are illustrated in FIG. 6 and FIG. 7, respectively. As shown in FIG. 6, a system useful for forming protected fibers in the form of the fiber protective carrier illustrated in FIG. 1 includes a means for forming a single layer of a plurality of collimated fibers, partially identified in FIG. 6 and FIG. 1 as 14, 16, 18, 20, and a means for grouping collimated fibers 14, 16, 18, 20 into a plurality of collimated fiber bundles 22, 24, 26 for securing to a composite pre-slit tape 33.

More particularly, the system includes a filament puller 94, consisting of a first endless belt 159 on one side and a set of two endless belts 160 opposing the first endless belt, 159 for producing collimated fibers 14, 16, 18, 20 in a single plane from fiber source 95, and a tension sensing system 96 positioned for controlling tension to collimated fibers 14, 16, 18, 20 and passing the collimated fibers through comb 98 and to directional roll 110. Comb 98 is sized for grouping fibers 14, 16, 18, 20 into a plurality of collimated fiber bundles 22, 24, 26 oriented in a single plane. A rotatable composite pre-slit tape let-off 106 houses a roll of composite pre-slit tape 111 having the general configuration and structural components as the composition pre-slit tape of FIG. 1 and FIG. 2 or alternatively having the general configuration of FIG. 4. Composite pre-slit tape let off 106 is positioned to rotatably feed composite pre-slit tape 12 to a tape guiding device 108 for aligning each pre-slit laminate (not shown) with a corresponding fiber bundle 22, 24, 26. At directional roll 110, pressure roller 112 secures each of the aligned collimated fiber bundles 22, 24, 26 to a corresponding pre-slit laminate by applying pressure and causing pre-slit laminates to immobilize their corresponding aligned fiber bundle. Finally, a product winder 114 winds the resulting fiber protective carrier 10 onto take-up roll 116 for storage.

Preferred systems for producing fiber protective carriers further include a heating element 120, for example a focused infra-red heater, adjacent directional roll 110 and pressure roller 112. The heating element serves to soften the second adhesive layer of each pre-slit laminate or the fiber support layer of each pre-slit laminate and enhances the integrity of the adhesive bond between the fibers and the fiber support layer.

As a feature of the present invention, a precursor composite pre-slit tape can exist in the form of laminated precursor tape. Essentially, the precursor tape is the composite pre-slit tape prior to forming the pre-slit laminates using tape splitting techniques. More particularly, the precursor tape is formed by releasably bonding a suitable continuous backing layer tape to a continuous laminate of a fiber support layer located between a first and second adhesive layer. In order to provide pre-slit laminates having the desired width for accommodating the desired number of corresponding fibers, the precursor tape can be housed on tape let-off 106 and slit to form the pre-slit laminates just prior to being paid off the tape let-off 106. A particularly suitable slitting technique is known in the art as a kiss slitting method and involves longitudinally slitting through the fiber supporting layer and the first and second adhesive layer while preserving the continuous backing layer. This feature provides enhanced versatility to process systems having varying requirements with respect to the number of fibers forming each fiber bundle and the number of fiber bundles oriented on a single plane.

Protected fiber bundles such as the combination of secured fibers and composite pre-slit tape in the form of a fiber protective carrier 10 of FIG. 1 taken up on take-up roll 114 of FIG. 6 are capable of subsequent handling with little or no concern with fiber breakage. Even if breakage of the filament inadvertently occurs, the carrier maintains the filament in the proper position relative to the other filaments. For example, a preferred system and process for handling protected fibers is illustrated in FIG. 7 which schematically shows a system for feeding fiber protective carriers of the present invention to a weaving loom. The feeding process includes providing a fiber protective carrier 10 shown in FIG. 1 on take-up roll 114, removing releasable backing layer 33 from the composite pre-slit tape 12, and feeding the resulting pre-slit laminates and bonded fiber bundles 156 to weaving loom 140 for forming into woven fabric. More particularly, FIG. 7 shows the fiber protective system of FIG. 1 positioned on product take-up roll 114 as illustrated in FIG. 6. Fiber protective system 10 is passed off rotating product tape let-off 148 to directional roll 150 where continuous backing film 33 of the fiber protective system is released from the combination of pre-slit laminates and protected fiber bundles 156 and taken up by rotating backing film take-up 152. Weaving loom 140 receives the pre-slit laminates and secured fibers bundles 156 and for weaving into a predetermined woven fabric.

In accordance with the present invention, each fiber bundle remains secured to its corresponding pre-slit laminate and functions as yarn during the weaving process. Once the woven fabric is produced, the fibers remain secured to the pre-slit laminates providing continued support and protection for the fibers during subsequent handling. In applications where the woven fabrics produced in accordance with the present invention are incorporated into ceramic matrix composites, the woven fabric can be impregnated with ceramic according to processes known in the art. Then during the ceramic firing process the pre-slit laminate burns off, and only the fibers of the woven fabric remain. As an alternate, in special circumstances, the pre-slit laminate can be burnt off of the woven fabric and subsequently impregnated with ceramic matrix.

Taken in combination with FIG. 6 and FIG. 7, the following example provides a non-limiting description of an exemplary process for providing protected high modulus fibers for feeding to conventional weaving equipment in processes for the fabrication of woven fabric reinforcement.

EXAMPLE

Three hundred thirty (total number not shown in FIG. 6 and FIG. 7 in full) single crystal alumina (sapphire) fibers having a diameter of 3 mils each were drawn from a filament drawing crucible shown at numeral 95 in FIG. 6, and pulled from the crucible 95 by a caterpillar filament puller 94. The fibers were then controlled by a tensioning device 96 or by caterpillar device 94 by driving the forward endless bolt 159 at a slightly faster rate than the rear endless bolt 160 to put very slight but uniform tension on each fiber to prevent buckling and subsequent fiber breakage as the fibers pass through the reed or comb 98 to the directional roll 110. At the reed or comb 98 the 330 fibers were grouped into 30 groups of 11 fibers each.

A precursor tape was prepared by forming a 1.0 mil thick adhesive film of ReMount adhesive, purchased from 3M of Minneapolis, MI, on a continuous backing film of 1.5 mil MYLAR having a width of three inches. A second film of 1.0 mil MYLAR fiber support layer was applied to the 1.0 mil adhesive film and a second 1.0 mil thick ReMount adhesive film was formed on the MYLAR fiber support layer. This precursor tape was split longitudinally using a kiss splitting technique to form a series of 30 pre-slit laminate repeating units each having a width of 52 mils and releasably bonded to the continuous backing layer. This composite pre-slit tape 10 was wound onto a pre-slit tape let-off 106 from which the tape was paid off. After passing through a tape guiding system 108 where each pre-slit laminate was aligned with a corresponding fiber bundle, 22, 24, 26, the composite pre-slit tape and fiber bundles were combined at directional roll 110. In order to prepare the second adhesive layer of each pre-slit laminate for receiving their corresponding fibers, a focused infra-red heater 120 supplied heat to the composite pre-slit tape and softened the second adhesive layer. A pressure roller 112 applied pressure to the directional roll 110 and the composite pre-slit tape 10 to insure that fibers adhere to the fiber support layer via the softened adhesive layer. Finally, the immobilized fibers and the protective carrier 116 were wound on to take-up roll 114 for storage.

In order to supply weaving equipment with sapphire fibers for forming woven sapphire fabric, the immobilized sapphire fibers and protective carrier 116 were fed to a loom as shown in FIG. 7. More particularly, the protective carrier and secured fiber bundles 116 were paid off of the tape let-off 148 and directed to directional roll 150 where the continuous 1.5 mil MYLAR backing layer was separated from the 30 pre-slit laminates and corresponding 30 fiber bundles. The separated 1.5 mil MYLAR continuous backing layer 33 was taken up on the backing film tape-up 152 and the sapphire fibers and pre-slit laminates were fed to a weaving loom 140 as yarn for the formation of high strength sapphire woven fabric.

Having thus described preferred exemplary embodiments of the present invention, it should be noted by those skilled in the art that the disclosure herein are exemplary only and that alternative, adaptations, and modifications may be made within the scope of the present invention. Accordingly, the present invention is not limited to the specific embodiments illustrated herein.

We claim:

1. A protected fiber system having improved high modulus fiber storage and handling characteristics, said system comprising:
   a) a composite pre-slit tape comprising a plurality of generally elongated and collimated pre-slit laminates oriented in a single plane and releasably bonded to a removable continuous backing layer, each of said pre-slit laminates comprising:
      a first releasably bonding adhesive layer located adjacent said continuous backing layer and forming a releasable bond with said backing layer; and
      a fiber supporting layer fabricated of a member selected from the group consisting of polyethylene terephthalate, polyethylene, polypropylene, and nylon located adjacent said first adhesive layer; and
   b) a plurality of collimated fiber bundles oriented in a single plane, each of said fiber bundles comprising a plurality of collimated high modulus fibers arranged in a single layer, each fiber having a length and a diameter, and each fiber separately bonded along said length to said fiber supporting layer of a corresponding pre-slit laminate.

2. The protected fiber system of claim 1 further including a second adhesive layer located adjacent said fiber supporting layer opposite said first adhesive layer.

3. The protected fiber system of claim 1 wherein said continuous backing layer is formed of a material selected from the group consisting of thin films of metal foils and films of relatively high modulus organic polymers.

4. The protected fiber system of claim 1 wherein said continuous backing layer has a width of from about 0.5 inches to about 12 inches.

5. The protected fiber system of claim 1 wherein said plurality of pre-slit laminates numbers from about 1 to about 100.

6. The protected fiber system of claim 1 wherein said pre-slit laminates have a width of from about 0.010 inches to about 0.075 inches.

7. The protected fiber system of claim 1 wherein said continuous backing layer has a thickness of from about 0.5 mils to about 5.0 mils.

8. The protected fiber system of claim 2 wherein said first and second adhesive layers have an adhesive thickness of from about 0.500 inches to about 0.002 inches.

9. The protected fiber system of claim 1 wherein said supporting layer has a thickness of from about 0.5 mills to about 5.0 mils.

10. The protected fiber system of claim 1 wherein said fibers are selected from the group consisting of sapphire fibers, boron fibers, yttrium fibers, and yttrium aluminum garnet (YAG) fibers.

11. A protected fiber system having improved high modulus fiber storage and handling characteristics, said system comprising:

a) a composite pre-slit tape comprising a plurality of generally elongated and collimated pre-slit laminates oriented in a single plane and releasably bonded to a removable polyethylene terephthalate film continuous backing layer, each of said pre-slit laminates comprising:

a first releasably bonding adhesive layer located adjacent said polyethylene terephthalate backing layer;

a fiber supporting layer formed of polyethylene terephthalate film; and a second adhesive layer, said fiber supporting layer located between said first releasably bonding adhesive layer and said second adhesive layer; and b) a plurality of collimated fiber bundles oriented in a single plane, each of said fiber bundles comprising a plurality of collimated sapphire fibers arranged in a single layer, each sapphire fiber having a length and a diameter, and each sapphire fiber separately bonded along said length to said fiber supporting layer of a corresponding pre-slit laminate.

* * * * *